(No Model.)

W. H. BARR.

METHOD OF FINISHING GLASS ARTICLES.

No. 335,987. Patented Feb. 9, 1886.

WITNESSES:
Denver E. Wolcott
C. M. Clarke.

INVENTOR,
William H. Barr.
BY George H. Christy
ATTORNEY.

UNITED STATES PATENT OFFICE.

WILLIAM H. BARR, OF STEUBENVILLE, OHIO, ASSIGNOR OF ONE-HALF TO A. J. BEATTY & SONS, OF SAME PLACE.

METHOD OF FINISHING GLASS ARTICLES.

SPECIFICATION forming part of Letters Patent No. 335,987, dated February 9, 1886.

Application filed July 25, 1885. Serial No. 172,612. (No model.)

*To all whom it may concern:*

Be it known that I, WILLIAM H. BARR, residing at Steubenville, in the county of Jefferson and State of Ohio, a citizen of the United States, have invented or discovered certain new and useful Improvements in Methods of Finishing Glass Articles, of which improvement the following is a specification.

Figure 1:
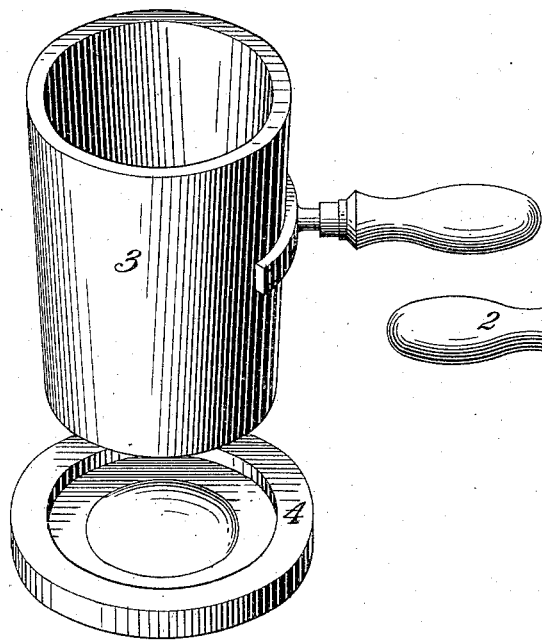
Figure 2:
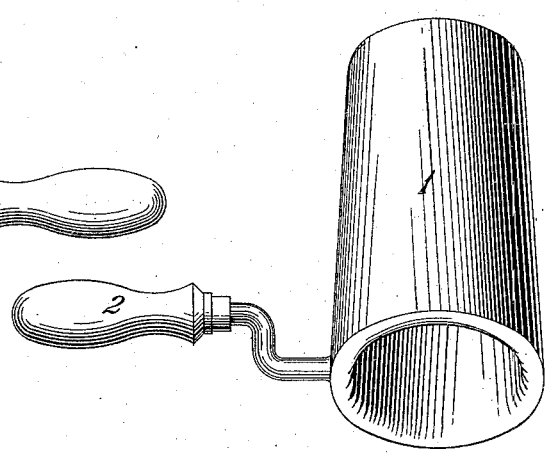
Figure 3:
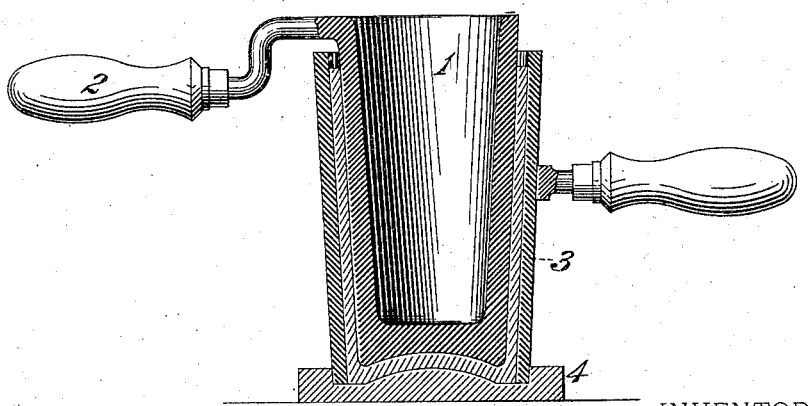

In the accompanying drawings, which make part of this specification, Figure 1 is a perspective view of the external finishing-tool. Fig. 2 is a similar view of the internal former or finishing-tool. Fig. 3 is a sectional elevation of both formers in operation.

In the manufacture of jelly-glasses and other like articles the glass is first formed or shaped in a suitable mold, and then, after being heated, is finished both exteriorly and interiorly by an operator having a suitable finishing-tool, or by placing the article upon a revolving former, and then pressing a block upon the exterior surface of the article, such block bearing upon a portion of the surface; but in the hand-finishing operation the diameter of the glasses or tumblers is changed, nor is the change or variation effected in the finishing operation always the same; hence when a cover is used in connection with the hand-finished glasses it is necessary to make the tops of very light expensive foil, in order that the flange may be bent in or out to correspond with the varying sizes of the glasses. In cases where heavy cheap tin is used for covers, said covers being stamped up in a press, the glasses are not finished, but are annealed in the condition in which they are removed from the mold. In such cases the glasses, although uniform in diameter, have rough uneven edges, and therefore cannot be employed for any other purpose.

The object of the invention herein is to provide, by means of suitably-constructed tools, for the uniform finishing of molded glass articles; and to this end my invention consists in the improved method of finishing such articles, all as more fully hereinafter described and claimed.

In carrying out my improved method of finishing, the tumblers or other articles are formed in suitable molds in the usual manner, and after being attached to a punty-rod are heated in the glory-hole to the proper finishing heat. After being properly heated the article is placed over the former or internal finishing-tool 1 and the punty-rod removed. The former 1 is made of a size and shape corresponding to the internal size and shape of the article to be finished. For ease in handling, the former is made hollow, and is provided with a handle, 2, whereby it may be manipulated. After the heated article has been placed on the former the latter is turned over and placed within the cup or finishing-mold 3, said mold consisting of a cylindrical shell having an internal size and configuration corresponding to the external size and shape of the desired article and of the base 4, provided with a recess for the reception of the lower end of the cylinder, the bottom of the recess being constructed to fit the bottom of the article being shaped, as clearly shown. The inner and outer wall of the article being treated are finished by pressing the former down into the article, and then rotating the former; or the former and mold may both be rotated simultaneously, but in opposite directions. After the articles have been treated as above stated they are removed from the finishing-tools and annealed in the usual manner. By this method of finishing molded glass articles a perfect uniformity of size and finish is attained, and this uniformity is of especial advantage in the manufacture of jelly-glasses, as it permits of the use of heavy cheap tin for the covers of such finished glasses. Another advantage arising from the practice of this method is that unskilled labor may be employed, and at the same time a uniform and finished article may be produced.

I claim herein as my invention—

The method of finishing molded glass articles which consists in slightly compressing their reheated inner and outer side walls simultaneously all around between an interior cylindrical former and an interior tubular former, and at the same time rotating one or the other of the inclosing devices, substantially as set forth.

In testimony whereof I have hereunto set my hand.

WILLIAM H. BARR.

Witnesses:
W. McD. MILLER,
JAS. G. WEY.